United States Patent Office 3,311,591
Patented Mar. 28, 1967

3,311,591
PROCESS FOR THE PRODUCTION OF HIGH MOLECULAR WEIGHT POLYOXYMETHYLENES
Kuno Wagner and Ernst-Ulrich Köcher, Leverkusen, Germany, assignors to Farbenfabriken Bayer Aktiengesellschaft, Leverkusen, Germany, a German corporation
No Drawing. Filed Sept. 25, 1963, Ser. No. 311,310
Claims priority, application Germany, Oct. 13, 1962,
F 38,027
4 Claims. (Cl. 260—67)

This invention relates to a process for the production of high molecular weight polyoxymethylenes by the polymerization of formaldehyde, compounds of divalent tin being used as catalysts.

It is known that practically anhydrous, highly purified formaldehfde having a water content of less than 0.05% can be polymerized with the aid of numerous catalysts such as boron trifluoride, oxonium salts, tertiary and quaternary nitrogen bases, metal salts, metal alcoholates, organometallic compounds, suphonium salts, phosphonium salts etc. in inert solvents to produce high molecular weight polyoxymethylenes. It is further known that formaldehyde gases having a relatively high water content can be polymerized to high molecular weight polyoxymethylenes with the aid of special catalysts.

In this case, impure formaldehyde having a water content of about 0.5 to 5% is introduced into an inert organic solvent or into a solvent having an acylating or an alkylating action or it is passed over high molecular weight polyoxymethylene in the absence of solvents, and special catalysts, preferably compounds of divalent tin, are added to the polymerization mixture. With this method, the chain breaking reaction due to water and other impurities may be slowed down considerably so that high quality polyoxymethylenes having internal viscosities of about 0.6 to 3 (measured in dimethylformaldehyde or butyrolactone at 150° C. in 0.5% solution), corresponding to average molecular weights of about 30,000 to 150,000, may be obtained Among the various divalent tin compounds it is mainly the divalent tin salts of organic carboxylic acids as well as freshly prepared, colloidal dissolved divalent tin hydroxides which have hitherto been of practical importance in the polymerization of formaldehyde. With numerous other divalent tin compounds, both inorganic and organic, it has not been possible to confirm the exceptional properties of the divalent tin radical as initiator in the polymerization of formaldehyde, so that one had to assume that the anion of the catalyst, i.e. mainly the acyl radicals of organic carboxylic acids, are of decisive importance in the polymerization processes (chain starting, chain breaking, transfer reactions) of the polymerization reaction which is disturbed relatively little by water. Although these catalysts, which may be prepared, for example from divalent tin chloride and which could hitherto not be used, are highly active polymerization catalysts for highly purified formaldehyde, they have only been able to produce polyoxymethylenes similar to paraformaldehyde when used as catalysts for the polymerization of formaldehyde vapours which contain water.

It has been found that the reason why numerous divalent tin compounds cannot be used in the process of the cited prior patents is than when divalent tin compounds are prepared from divalent tin chloride they usually contain small quantities of dissociable halogen compounds as well as portions of soluble alkali metal salts and more or less large quantities of tetravalent tin compounds. The increased proportion of tetravalent tin compounds is due to the fact that the liability of divalent tin to oxidise has hitherto not been sufficiently taken into account in the preparation of catalysts. The first two impurities mentioned will seriously impair the polymerization process even when present only in quantities of a few milligrams per litre of polymerization medium, and the third component, namely the tetravalent tin compounds, also seriously reduces the catalytic effect of the catalyst if present in proportions of more than 10% calculated on the divalent tin. The chain breaking reactions released by the said impurities have the effect that the good property of the divalent tin catalysts of rapidly encouraging polymerization when the chain breaking reactions are relatively strongly retarded, is completely masked by the influence of the impurities.

The object of this invention is a process for the production of high molecular weight polyoxymethylenes by the polymerization of formaldehyde which contains impurities, this process employing catalysts consisting of divalent tin compounds of the general formula

or

in which R represents the radical of a phenol or thiophenol which may, if desired be substituted, and $R_1$ represents the radical of a pyrocatechol derivative. The process may be carried out by polymerizing gaseous formaldehyde containing impurities such as 0.5 to 3% water, in inert solvents, acylating agents or alkylating agents or in the gaseous phase over large surfaces, e.g. over polyoxymethylene, at normal pressure, elevated pressure or pressures below 760 mm. Hg, if desired with the use of inert gases such as toluene or inert vapours of organic liquids such as toluene, in the presence of catalytic quantities of the said tin-II-compounds.

Examples of catalysts that may be used according to the invention are compounds of divalent tin with 2,6-ditertiary-butylphenols or -thiophenols, 2,6-ditertiary-butylphenols substituted with methylene urea and with methylene thiourea radicals, pyrocatechol derivatives substituted with methylene alkyl ether radicals and pyrocatechol, in phenol derivatives whose nucleus is condensed with a heterocyclic ring which may be substituted, for example 8-hydroxyquinoline.

With the aid of these new divalent tin catalysts having a very high degree of purity it is possible to use, for the polymerization, relatively impure formaldehyde such as that obtained, for example, in the pyrolysis of paraformaldehyde or α-polyoxymethylene, without intermediate purification, for example by freezing preliminary polymerization or other measures, and this impure formaldehyde can be converted into high molecular weight polyoxymethylenes having valuable technological properties.

As already indicated, this finding is surprising because when the same catalysts are used but with halogen contents of only 0.5%, alkali contents of only 0.3% and Sn-IV-contents of 15–20% for the polymerization, in a large variety of polymerization media, of formaldehyde vapours obtained by the decomposition of paraformaldehyde, only very low molecular weight polyoxymethylenes similar to paraformaldehyde are obtainable. It has been found that particularly divalent tin compounds which contain small proportions of Sn–Cl groups, e.g. in the form of

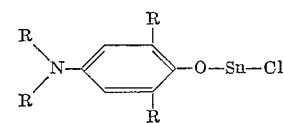

(R=alkyl), have a very disturbing effect on the polymerization because the chain breaking reactions due to water and other impurities then take place much more rapidly, thereby preventing the formation of high molecular weight polyoxymethylenes.

These catalysts at the same time give increased protection against oxidation reactions and lead to products which have a reduced ash content (often due to $SnO_2$) after acetylation or etherification, whereby the thermostability of the polyoxymethylenes which have been stabilised in their end groups is increased.

To carry out the process according to the invention, it is preferable to work with formaldehyde vapours which contain about 0.5 to 1% water and about 0.3% methanol. A formaldehyde of this degree of impurity can be obtained in a simple manner for example by the pyrolysis of paraformaldehyde having a water content up to 1%, with or without a heat transfer agent. The gases obtained by pyrolysis are then introduced into the polymerization vessel at temperatures of about 90 to 150° C., if desired at reduced or elevated pressure, care being taken to avoid any preliminary polymerization. A good source for the preparation of formaldehyde vapours which contain methanol and have a lower water content are formaldehyde gases obtained in the dehydrogenation of methanol in the absence of hydrogen acceptors. It is sometimes desirable to free such gases from traces of coloured, easily volatile unknown substances by washing them in solvents heated above 90° C. or to remove larger quantities of formic acid by suitable measures, and again any preliminary polymerization is avoided by using sufficiently high temperatures.

In carrying out the polymerization process according to the invention it is important to introduce the formaldehyde gradually into the polymerization medium and to stimulate the polymerization process continuously with fresh catalyst. This increases the yield of high molecular weight polyoxymethylene. 0.000015 to 0.01 mol, preferably 0.0001 to 0.002 mol of catalyst per mol of formaldehyde is generally used if the polymerization is carried out in inert or alkylating solvents. If, on the other hand, the polymerization is carried out in acetic anhydride or some other acylating agent, it is advantageous to use much higher concentrations, namely, 0.001 to 0.006 mol of catalyst per mol of formaldehyde. Moreover, when the polymerization is carried out in acetic anhydride it is advantageous to use formaldehyde vapours having a water content of less than 1% because otherwise the free acetic acid formed in the course of polymerization has an increasingly disturbing chain breaking effect.

The catalysts are preferably used in the form of 0.01 to 1% solutions in inert, acylating or alkylating solvents, for example in methylene chloride, 1,2-dichloropropane, carbon tetrachloride, aromatic hydrocarbons such as toluene, ethyl acetate, acetic anhydride, orthofumaric acid ethyl ester, formaldehyde dimethylacetal. The catalyst should as far as possible be added evenly over the whole polymerization time. The rate at which the catalyst is added is, of coruse, variable and depends on the flow velocity at which the formaldehyde is introduced into the polymerization vessel. For example, in the batchwise method it is advantageous to introduce 30 to 70% of the total amount of catalyst at the start and to add the remaining quantity in doses distributed over the whole polymerization time, by means of a dosing pump. It is important to dose the catalyst accurately and continuously because a formaldehyde having, for example, a degree of impurity corresponding to 2.5% water and 0.1 to 0.3% fumaric acid will introduce impurities into the reaction which are themselves catalytic. This catalytic activity, however, is practically of no importance owing to the many times higher activity of the divalent tin compounds, provided the tin compounds are present in sufficient concentration in the polymerization mixture.

If the polymerization is carried out in inert solvents, then aromatic, araliphatic, cycloaliphatic, and/or aliphatic hydrocarbons and their halogenation products may be used as solvents. However, it is preferable to work in methylene chloride because this is an excellent solvent for the very low molecular weight formaldehyde hydrate formed in the process and because this solvent can be obtained in a very high degree of purity. It is also possible to use solvents such as 1,3-dichloropropane. Carbon tetrachloride and chloroform may also be used for the polymerization provided they are sufficiently free from hydrogen chloride and phosgene.

If the polymerization is carried out in acylating agents, it is preferable to use acetic anhydride, if desired as mixture with other solvents. However, other acylating agents may also be used.

If the polymerization is carried out in alkylating agents, it is preferable to use orthoformic acid ethyl ester as solvent.

The quantity of solvent used may vary within wide limits. It is generally advisable to use about 7 to 12 parts by volume of solvent to 1 part by weight of formaldehyde. The catalyst generally dissolved in the same solvent as that used for the polymerization.

The polymerization may be carried out at temperatures of −120° to +150° C. It is often advantageous to work at temperatures between −20 and +90° C.

The flow velocity with which the formaldehyde vapours are passed or introduced into the polymerization vessel is variable and depends on the speed of pyrolysis as well as on the temperature conditions in the polymerization vessel.

If the polymerization is carried out in inert solvents, the polymer is separated from the solvent by filtration or centrifuging. The process may be carried out continuously or semi-continuously. Fresh solvent and fresh catalyst may be introduced into the polymerization vessel at a rate corresponding to the removal of polymer.

If the polymerization has been carried out in an acylating solvent, acylating catalysts are added to the polymerization mixture after polymerization is completed, and the mixture is heated to temperatures above 100° C. in order to convert all the end groups and to remove residues of catalyst.

The great advantage of the process according to the invention compared with the polymerization processes hitherto known is that formaldehyde having a relatively high water content can be polymerized to high molecular weight polyoxymethylenes, any purification of the formaldehyde vapours by preliminary polymerization and the difficult continuous removal of the preliminary polymer being completely dispensed with. Another important advantage is the fact that the impure formaldehyde used for the polymerization is easily accessible. Further advantages of the process according to the invention lie in the fact that the catalyst residues are more easily removed from the high molecular weight polyoxymethylenes, whereby the thermostability and the colour properties of the polymers are improved, particularly after they have been worked up. Further advantages consist in the improved possibility of chain control and the production of high molecular weight polyoxymethylenes which are more easily worked up.

The high molecular weight polyoxymethylenes prepared by the process according to the invention and stabilised by the methods indicated above may be worked up to high quality synthetic resins, with or without the addition of other substances; such substances are, for example heat stabiliser, antioxidants, plasticisers, fillers, pigment dyestuffs, light protective agents, optical brightening agents and the like.

In the following examples, the parts given for solvents are parts by volume and the other parts are parts by weight.

EXAMPLE 1

140 parts by weight of paraformaldehyde having a water content of 0.65% are decomposed at 124–140° C.

in an inert heat transfer agent consisting of Mepasin, in a round bottomed flask. The hot formaldehyde vapours pass through a double walled tube of VA steel heated to about 100° C. with steam and through a lid which is also heated with steam and which contains a thermometer, stirrer and outlet tube, into a cylindrical reaction vessel. The reaction vessel has a cross section of about 12 cm. and a capacity of 2000 cc. and is connected to the hot lid through an insulating seal. The outlet of the heated VA tube is about 2 cm. above the liquid level of the polymerization medium. The outlet tube of the heated lid is connected with a Woolf's flask which contains water as covering and receiving liquid and is secured against excess pressure by means of a small ascending tube. The polymerization medium consists of 1400 parts of pure toluene having a water content of 0.02% and contains as catalyst 0.9 part by weight of the following tin compound

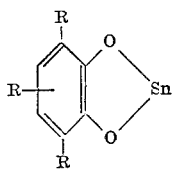

$R=C_4H_9-O-CH_2-$

A further 0.4 part by weight of the tin compound is dissolved in toluene, and introduced dropwise into the polymerization vessel at a uniform rate over the whole polymerization time. The hot, impure formaldehyde vapours are passed over the surface of the liquid which is stirred at a rate of about 60 revolutions per minute, preliminary polymerization of the formaldehyde being completely suppressed so that its degree of impurity is maintained. Polymerization starts at once and pyrolysis is completed in about 2 hours. Although the formaldehyde vapours are only passed over the surface, the uptake of formaldehyde is excellent and although the gas outlet tube is open to the Woolf's flask, less than 4% formaldehyde are in the covering fluid at the end of polymerization. The polymerization temperature is maintained at about 25 to 30° C. by cooling with water. At the end of polymerization, the polymerization product is filtered by suction, washed with acetone and dried in vacuo at 40° C. A pure white, high molecular weight polyoxymethylene is obtained in a yield of 112 parts by weight. After acetylation, the product has an internal viscosity of 1.25, measured in 0.5% solution in butyrolactone at 150° C.

*Preparation of the catalyst*

30 parts by weight of paraformaldehyde are decomposed in 74 parts by weight of n-butanol in the presence of 0.3 cc. of normal sodium hydroxide to produce the corresponding semiacetal. 11 parts by weight of pyrocatechol are then stirred in gradually at 60° C. After one hour, the reaction mixture is adjusted to a pH of about 1 by means of hydrochloric acid and maintained at this pH for 2 hours at 60° C. The mixture is then neutralised with sodium bicarbonate diluted with toluene and filtered and the clear solution is concentrated by evaporation in a water jet vacuum and freed from toluene, excess formaldehyde, formaldehyde dibutyl acetal and butanol. The syrupy condensation product consisting of an isomeric mixture butyl ethers of pyrocatechol is taken up in 200 parts by volume of benzene and heated to boiling. A concentrated aqueous solution of 18.9 parts by weight of tin-II-chloride is added dropwise at a fairly uniform rate, and a concentrated aqueous sodium hydroxide solution containing 8 parts by weight of NaOH is added through a second dropping funnel. At the same time, water and benzene are removed azeotropically, benzene being returned to the reaction mixture through an esterification apparatus after the separation of water. After complete removal of water, $CO_2$ is passed for 5 minutes into the reaction mixture and the mixture is again diluted with 200 parts by volume of benzene. The separated sodium chloride and carbonates are removed by filtration, the filtrate is condensed and again filtered, and benzene is driven off in a vacuum. A syrupy divalent tin derivative of a polymethylol butyl ether of pyrocatechol highly soluble in organic solvents is obtained. The catalyst is used in this example for polymerization.

EXAMPLE 2

The process is carried out as in Example 1 but the following divalent tin compounds are used as catalyst:

| | Catalyst | Quantity of catalyst |
|---|---|---|
| (a) | (R—⟨R,R⟩—S)$_2$=Sn | Isomeric mixture in addition to thiophenolformaldehyde condensates etherified with butanol 2.4 parts by weight. |
| (b) | ($C_4H_9$—O—$CH_2$—⟨R,R⟩—O)$_2$=Sn<br>R=tertiary butyl | 0.85 parts by weight. |
| (c) | ($C_4H_9$O—$CH_2$—NH—C—NH—$CH_2$—⟨R,R⟩—O)$_2$=Sn<br>R=tertiary butyl | 1.7 parts by weight. |

The compounds are polymerized according to Example 1, and polyoxymethylenes having the following internal viscosities are obtained in the following yields after acetylation:

| Experiment | Yield | Internal viscosity [1] |
|---|---|---|
| (a) | 108 parts by weight | 1.38 |
| (b) | 105 parts by weight | 1.24 |
| (c) | 101 parts by weight | 0.98 |

[1] Measured in butyrolactone at 150° C. in 0.5% solution.

*Preparation of catalyst (a)*

Using the same method of preparation of catalyst as in Example 1, the reaction is carried out with thiophenol by the same process and corresponding proportions. A polymethylol-butyl ether-tin-II-condensate is obtained which is used as catalyst in Example 2a. Syrupy, yellowish liquid easily soluble in benzene, toluene, methylene chloride, orthofumaric acid ethyl ester and acetic anhydride.

*Preparation of catalyst (b)*

20.6 parts by weight of 2,6-di-tertiary-butylphenol are dissolved in 104 parts by weight of a semiacetal of n-butanol and formaldehyde and condensed at a pH of about 1. During the condensation, water is removed azeotropically with the aid of 200 parts by volume of added benzene. The mixture is neutralized with sodium bicarbonate, more water is removed azetropically and concentrated aqueous solutions containing 9 parts by weight of tin-II-chloride and 4 parts by weight of NaOH are added dropwise. After removal of the water, $CO_2$ is passed through for 5 minutes at room temperature and the mixture is then filtered and benzene, formaldehyde dibutylacetal, small quantities of formaldehyde and butanol are removed from the reaction mixture in a water jet vacuum. A viscous, resinous product of a 2,6-di-tertiary-butyl-tin-II-phenolate which is substituted in the p-position by the methylolbutylether radical is obtained. The catalyst is used for the polymerization in Example 2b.

*Preparation of catalyst (c)*

The catalyst is prepared by the same method as used for catalyst (b) but the semi-acetal of n-butanol and formaldehyde is replaced by urea-mono-N-methylbutyl ether. 14.6 parts by weight of this ether are heated to boiling in 100 parts by volume of benzene with 20.6 parts by weight of 2,6-di-tertiary-butylphenol and 4 parts by weight of paraformaldehyde at a pH of about 1, water being removed azeotropically. The divalent tin compound is then prepared by the method given for the preparation of catalyst (2b). After removal of the solvent, an easily soluble divalent tin compound is obtained which contains small quantities of impurities in the form of butylated urea formaldehyde condensate. The catalyst is used for polymerization in Example 2c.

EXAMPLE 3

The process is carried out as in Example 1, but the polymerization medium is (a) Very highly purified acetic anhydride containing 0.25% free acetic acid, and
(b) Orthoformic acid ethyl ester.

In experiment (a) and experiment (b), a divalent tin compound of 8-hydroxyquinoline (2.5 parts by weight) free from chlorine and alkali is used as catalyst. The polymerization is carried out according to Example 1, and in the case of (a) 0.8 part by weight of sodium acetate is added as acetylation catalyst after polymerization, and in the case of (b) 0.030 part by weight of boron trifluoride etherate is added as etherification catalyst after polymerization. The acetylation is carried out at 139° C. and the etherification is carried out at 120° C. After working up the product, acetylated or etherified high molecular weight polyoxymethylenes are obtained in the following yields and with the following internal viscosities (measured in butyrolactone at 150° C. in 5% solution):

| Experiment | Yield | Internal viscosity |
|---|---|---|
| (a) | 102 parts by weight | 0.95 |
| (b) | 67 parts by weight | 0.79 |

EXAMPLE 4

The process is carried out as in Example 1, the polymerization medium being toluene. 0.96 part by weight of a divalent tin compound of the formula

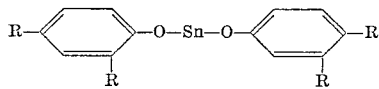

in which $R=C_4H_9-O-CH_2$ is used as catalyst.

The polymerization is carried out according to Example 1, and after acetylation a pure white polyoxymethylene is obtained in a yield of 108 parts by weight, the internal viscosity being 1.43 measured in butyrolactone at 150° in 0.5% solution.

*Preparation of the catalyst*

The process is carried out as described in Example 1 but the pyrocatechol used in that example is replaced by the equivalent quantity of 18.8 parts by weight of phenol. After working up as described for the preparation of catalyst in Example 1, a viscous tin-II-phenol derivative is obtained which is mainly substituted in the o- and p-position with methylene-n-butyl ether radicals. The catalyst is used in this example for polymerization.

What we claim is:

1. A process for the production of high molecular weight polyoxymethylene which comprises polymerizing monomeric gaseous formaldehyde containing 0.5 to 3.0% by weight of water in the presence of a catalytic amount of a compound of the formulae:

and

wherein R is a phenyl radical, $R_1$ is a 1,2-phenylene radical, and X is selected from the group consisting of —O— and —S— at temperatures of about −20 to 120° C. and recovering resulting high molecular weight polyoxymethylene.

2. The process of claim 1 wherein said polymerizing is carried out in an alkylating agent.

3. The process of claim 1 wherein said polymerizing is carried out in an acylating agent.

4. The process of claim 1 wherein said polymerizing is carried out in the gaseous phase in the presence of high molecular weight polyoxymethylenes in a fluidised bed.

References Cited by the Examiner

UNITED STATES PATENTS

| 2,848,437 | 9/1958 | Langsdorf et al. | 260—67 |
| 2,989,505 | 6/1961 | Hudgin et al. | 260—67 |
| 3,017,389 | 1/1962 | Langsdorf et al. | 260—67 |
| 3,216,972 | 11/1965 | Sidi | 260—67 |
| 3,232,906 | 1/1966 | Wagner | 260—67 |

SAMUEL H. BLECH, *Primary Examiner.*

WILLIAM H. SHORT, *Examiner.*

L. M. PHYNES, *Assistant Examiner.*